June 6, 1967 J. O. PROHASKA 3,323,423
REINFORCED FLEXIBLE DIAPHRAGMS
Filed March 3, 1965 4 Sheets-Sheet 1

INVENTOR.
JOHN O. PROHASKA
BY Tilberry & Body
ATTORNEYS

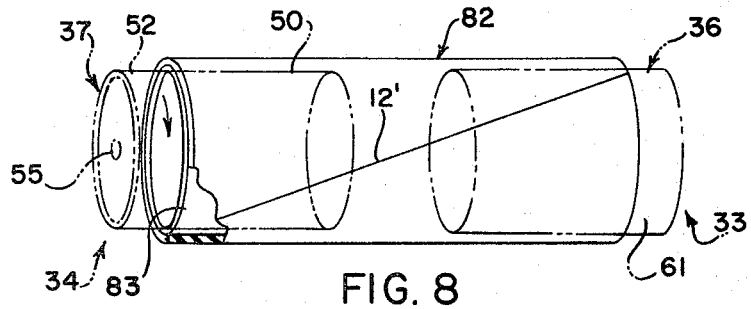
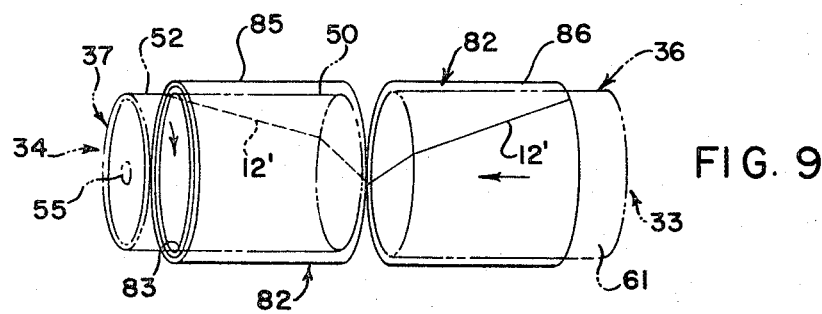
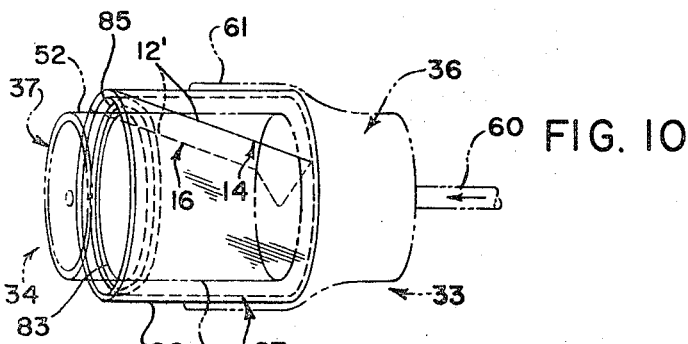
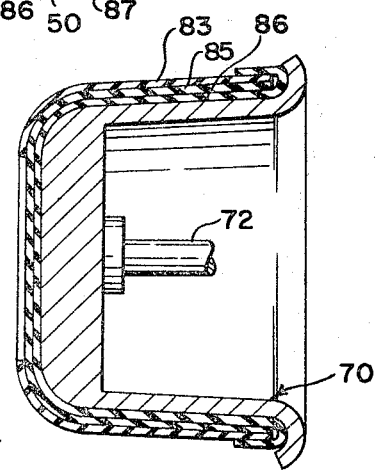
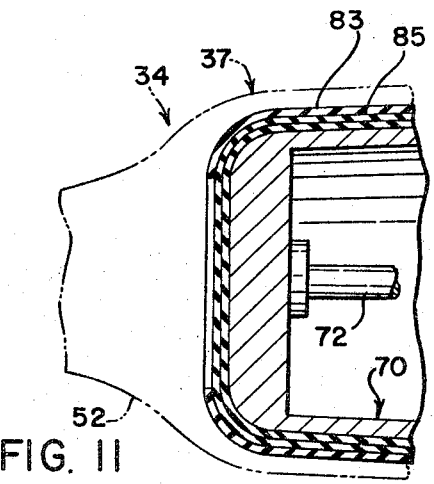
INVENTOR.
JOHN O. PROHASKA
BY *Tilberry & Body*
ATTORNEYS

United States Patent Office 3,323,423
Patented June 6, 1967

3,323,423
REINFORCED FLEXIBLE DIAPHRAGMS
John O. Prohaska, San Clemente, Calif., assignor to The Mansfield Tire and Rubber Company, Mansfield, Ohio, a corporation of Ohio
Filed Mar. 3, 1965, Ser. No. 436,823
5 Claims. (Cl. 92—103)

This invention pertains to the art of flexible diaphragms and more particularly to cord reinforced flexible diaphragms.

The invention is particularly applicable to a rolling sleeve type of diaphragm of the type used in pneumatic brake control systems and will be described with particular reference thereto, although it will be appreciated that the invention has much broader applications and may be utilized to full advantage in making other types of pneumatic or other fluid pressure type diaphragms.

Rolling sleeve diaphragms are normally in the shape of a cup having a more or less rigid base which bears against the plunger to be moved and a cylindrical sidewall, the free lip of which is clamped to the housing. The entire outer surface of such diaphragm is exposed to the high pressure which, when applied, drives the base through the cup so that the cup substantially turns itself inside out. The sidewalls of the cup roll on themselves to permit this movement.

In rolling sleeve diaphragms of the type to which this invention pertains, the sidewall of the diaphragm is required to carry the full tension of the load needed to move the plunger and high tensile strength and extremely high sidewall flexibility are required. At the same time, the base of the diaphragm must be generally firm and inflexible in order to minimize abrasion damage over the edge of the plunger. A soft and/or extensible base section will allow the sidewall to drag over the edge of this plunger and abrade through very rapidly.

Heretofore one method of making diaphragms of the type to which this invention pertains was to form a layer of square woven fabric between two layers of an elastomeric material and then mold this sandwich to the desired shape. The purpose of such combination is to utilize the strength and flexibility of textile materials in combination with the gas or fluid sealing qualities of the common elastomers such as rubber.

One problem with such diaphragms was the limited ratio of depth to diameter of the diaphragm which in turn limited the maximum amount of linear motion which a diaphragm of a given diameter could impart to a plunger. Any pronounced departure from a narrow flat disc or shallow bowl shape introduced severe fabric wrinkling problems.

A significant improvement in the method of making brake chamber diaphragms has been to form a sleeve from a flexible flat stock of uncured elastomeric material such as rubber having parallel extending reinforcing strands imbedded therein. The ends of the sleeve are placed over a pair of aligned spaced mandrels so that the ends are supported while the midsection is not. The midsection is then necked down by wrapping several turns of a strong cord under tension around the center of the sleeve. Next, one end of the sleeve is folded over the other end to form a double walled cup. Finally, this shape is molded into a cup under conditions of heat and pressure so that each reinforcing element extends continuously in the sidewall from the lip to the bottom, then across the bottom to the necking in cord where it reverses its direction, returns across the bottom to the sidewall and then down the sidewall to the lip. The small circle defined by the necking in cord is filled with unreinforced elastomeric material.

This method has been carried out in the past on an apparatus which employs a pair of axially spaced drum shaped mandrels, one of which is hollow and is formed of a flexible bag which can be inflated and rolled out over the surface of the other mandrel. The mandrels support the ends of the sleeve while the center is drawn in and by inflating the hollow bag, the sleeve is folded over on itself.

While such a method produced excellent diaphragms, certain problems were always present. Thus, the center of the base was devoid of cord reinforcement because it was impossible to neck the sleeve in to its full radius. Also, the cords did not extend across the entire bottom of the cup, but doubled back on themselves around the necking in cord as above pointed out. Also, if these necking in cords should break, either in manufacture or in use, an early failure of the diaphragm could result.

The present invention contemplates a rolling sleeve type diaphragm which overcomes all of the above-referred to difficulties and others and provides a diaphragm which has a large depth to diameter ratio for a maximum length of stroke, is easily manufactured, has maximum strength and is capable of long service under severe operating conditions.

In accordance with the invention, a rolling sleeve type of brake diaphragm is provided having a generally rigid base and flexible cylindrical sidewalls wherein the sidewalls and base are made up of at least two layers of reinforcing elements, each element extending in the sidewall from the lip to the bottom, thence across the bottom close to the center thereof and in the opposite portion of the sidewall out to the lip.

Further in accordance with the invention, inner and outer reinforcing layers are formed from continuous reinforced elements wherein each element in the inner reinforcing layer extends from the lip up one sidewall at an angle to the bottom and thence generally radially across the bottom to approximately the center and continues in the outer reinforcing layer, radially on across the bottom and down the opposite sidewall at an angle to the lip.

Further in accordance with the invention, the portion of the elements in each of the two layers in the sidewalls and in the base cross each other at a substantial angle, preferably in the neighborhood of 42°.

The principal object of the present invention is to provide a molded cord reinforced diaphragm of the type described which is easy to manufacture, has excellent flexing qualities and superior strength capabilities.

Another object of the invention is the provision of a deep rolling sleeve diaphragm which will have high tensile strength in the direction of the applied load.

Still another object of the invention is a rolling sleeve type of diaphragm made by folding one end of a fabric reinforced sleeve over the other end wherein the base of the diaphragm has cord reinforcement over substantially its entire surface.

Another object of the invention is the provision of a new and improved rolling sleeve cup-shaped diaphragm which has an abnormally large amount of generally radially extending cord reinforcement in the base where it is highly desirable for stiffness against radial distortion.

Still another object of the invention is the provision of a new and improved cord reinforced cup-shaped rolling sleeve diaphragm wherein none of the cords, either in the base or in the sidewalls, has reverse or sharp ends therein.

Another object of the invention is the provision of a new and improved cord reinforced cup-shaped rolling sleeve type of diaphragm wherein all of the cords of the diaphragm extend in a generally radial direction across the base and are all bunched close to the center.

Still another object of the invention is the provision of a new and improved rolling sleeve type of brake diaphragm which may be manufactured from conventional tire cord reinforcements consisting of a plurality of parallel strands held in position by a rubber binder rather than a woven fabric and which can be made into a deep cup without the problems of wrinkling of the woven fabric.

The invention may take physical form in certain parts and arrangements of parts and certain steps and combinations of steps, preferred embodiments of which will be described in detail in this specification and illustrated in the accompanying drawings which are a part hereof and wherein:

FIGURE 8 is a fragmentary side view of the apparatus of FIGURE 4 showing the sleeve of FIGURE 7 mounted on the mandrels thereof, the mandrels being shown somewhat schematically for the purposes of clarity;

FIGURE 9 is a view similar to FIGURE 8 but showing the sleeve of FIGURE 8 after one end has been rotated relative to the other;

FIGURE 10 is a view similar to FIGURE 8 but showing one end of the sleeve folded over the other end and with the expanded forming bag being shown in dash lines;

FIGURE 11 is a view showing the cup as formed in FIGURE 10 being folded inside out over the shaping mandrel by expanding the other forming bag; and, FIGURE 12 is a view similar to FIGURE 11 showing the peripheral edge of the reshaped cup being folded back to reinforce the diaphragm lip area.

Figure 1:
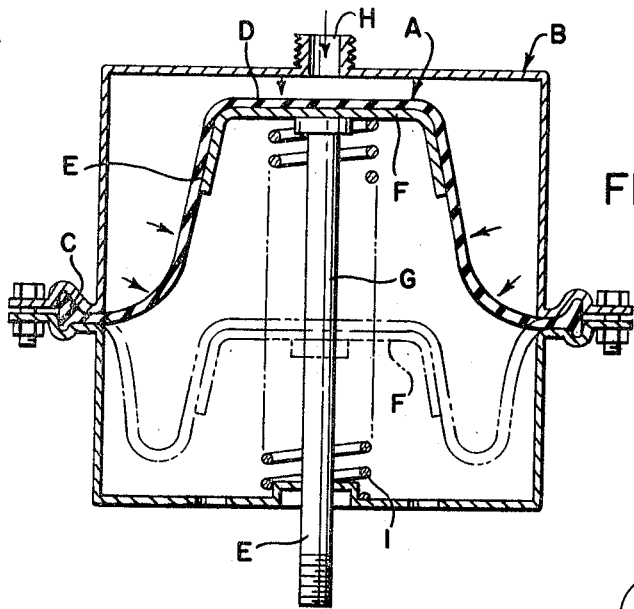
FIGURE 1 is a cross-sectional view of a brake cylinder and plunger having installed therein a brake diaphragm illustrating a preferred embodiment of the present invention, the diaphragm in dotted lines being shown in its partly collapsed position.

Referring now to the drawings wherein the showings are for the purpose of illustrating a preferred embodiment of the invention only and not for the purposes of limiting same, FIGURE 1 is exemplary of one application of a rolling sleeve type diaphragm A constructed in accordance with the invention. The diaphragm A is shown mounted in a brake chamber B. The clamping lip C of the diaphragm A is held by the two halves of the brake chamber B while the bottom D is supported on a pressure plate F and shaft G. When fluid under pressure is admitted through inlet H, force is applied to the diaphragm A as indicated by the arrows. The resultant force is radial and extends from the clamping lip C in the sidewalls E toward the center thus causing the diaphragm A to deflect to the position shown by the dot-dash lines thereby driving the pressure plate F and shaft G to the opposite end of the brake chamber B against the force of coil spring I. Thus high tensile strength and good sidewall flexibility are essential for a rolling sleeve diaphragm because the sidewalls of the diaphragm A are required to carry the full tension load needed to move the pessure plate F. At the same time, the bottom D must be relatively firm and inflexible in order to minimize abrasion damage over the edge of the pressure plate F. The aim of the present invention is to provide a novel diaphragm A particularly constructed for performance as a rolling sleeve diaphragm.

The diaphragm

Figure 2:
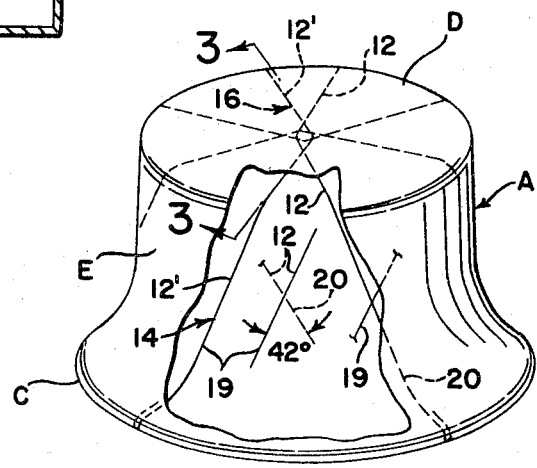
FIGURE 2 is a perspective view of the diaphragm of FIGURE 1 with portions of the elastomer being broken away to depict the lay of the individual reinforcing elements therein.

Referring now to FIGURE 2, the diaphragm A is shown as it appears after being molded to the desired deep cup shape. A reinforced elastomer is used capable of being molded under conditions of heat and pressure. The reinforcing material is in the form of embedded tire cord strands 12 arranged in two ply cord layers generally indicated by the numerals 14, 16 in FIGURE 3. In FIGURE 2 only a few strands 12 are shown and will serve to illustrate the overall pattern of the reinforcing layers 14, 16, however, both layers 14, 16 are actually comprised of many closely spaced continuous strands 12. The path of a single strand 12′ is traced in FIGURES 2 and 3 as being illustrative of the layer of all the strands 12, wherein the ends 19, 20 make up the outer and inner reinforcing layers 14, 16 respectively. More particularly, each strand 12 extends from the clamping lip C at an angle up the sidewall E to the bottom D and then across the bottom D as close to the center as possible continuing down the opposite sidewall E at an angle and returning to the clamping lip C. The angle of inclination of the ends 19, 20 is actually the primary cutting angle for the elastomeric sheet material from which the diaphragm A is formed as will be described hereinafter. Thus, this angle is subject to change as diaphragm design may require and no fixed angle can be given. However, as an approximation, the angle should be in the order of 21° from the plane of the diaphragm axis. As a result the individual strands 12 in one layer 14 cross with the strands 12 in the layer 16 at an angle of approximately 42° both in the sidewall E and bottom D of the diaphragm.

It is to be particularly noted that the center portion of each strand 12 passes over or as close to the center of the bottom D as the bunching together of all the strands will permit. In effect, each strand 12 runs tangentially to the diaphragm axis and does not have any sharp or reverse bends therein. The bunching of the strands 12 close to the center may be controlled by the circumferential displacement of the strand ends 19, 20 in the sidewalls E during the course of manufacture. In this connection, it will be understood that the ends 19, 20 are preferably displaced circumferentially at an angle of approximately 180°. However, circumstances and diaphragm design may require more or less of a displacement depending upon the ratio of diaphragm diameter to depth, strand size and other manufacturing variables.

Figure 3:
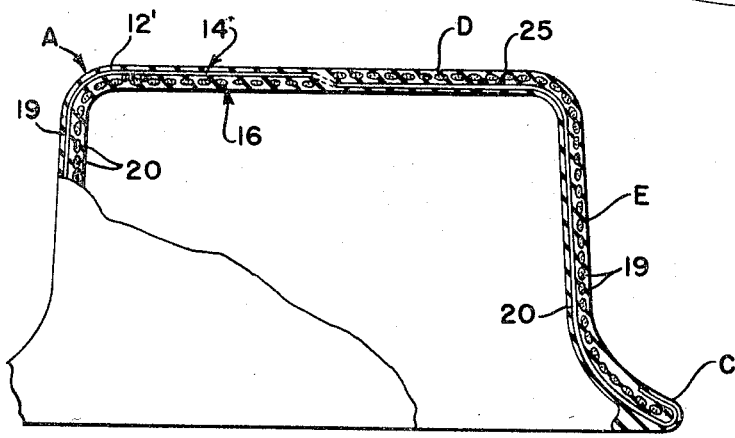
FIGURE 3 is a vertical sectional view of the diaphragm taken along the lines 3—3 of FIGURE 2 to show the course followed by one continuous reinforcing element in the sidewalls and bottom of the diaphragm.

While not normally considered necessary, if chafing all over the periphery of the pressure plate F is a particular problem, circumferential reinforcing 25 above, below or, as shown in FIGURE 3, between the inner and outer reinforcing layers 14, 16 may be provided.

Apparatus

Figure 4:
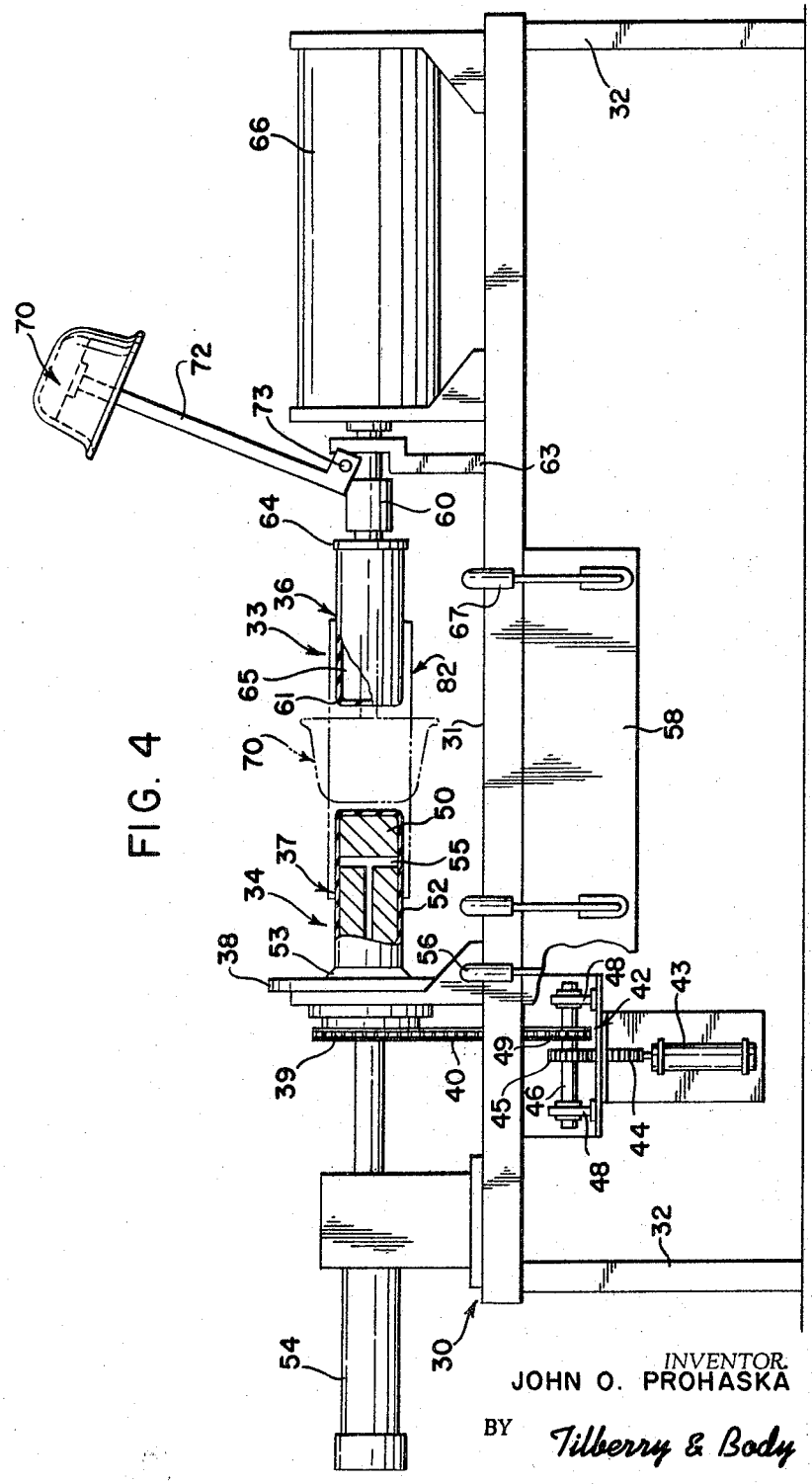
FIGURE 4 is a side-elevational view of a preferred embodiment of apparatus for manufacturing the diaphragm of FIGURE 1 and for carrying out the method of the invention, fragmentary portions of the sleeve of FIGURE 7 being shown in position thereon and portions of the apparatus being shown in cross section for the purposes of clarity.
Figure 5:
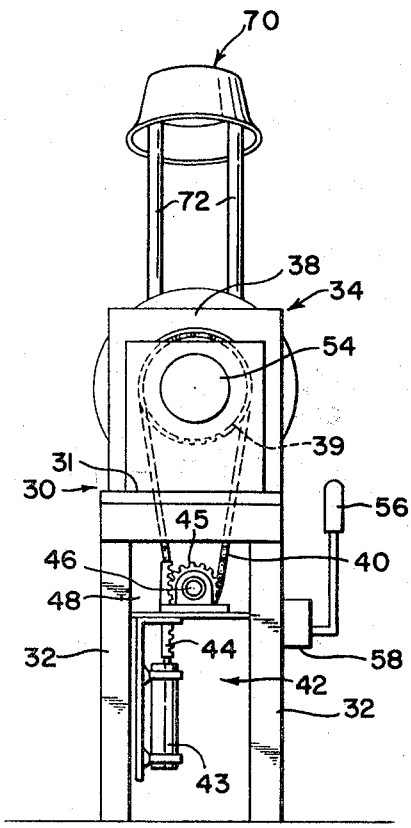
FIGURE 5 is an end view of the apparatus of FIGURE 4.

Referring to FIGURES 4 and 5, an apparatus is shown in more or less schematic form for making the inventive diaphragm A which includes a support table 30 providing a work surface 31 supported above the floor by end legs 32. Mounted on the surface 31 are a pair of oppositely facing work heads, generally indicated by the numerals 33 and 34, which include axially aligned mandrels 36 and 37 respectively. A reinforced rubber sleeve 82 shown in dot-dash lines extends between the mandrels and is wrapped around each so as to prevent relative movement of the sleeve on the mandrels in a manner to be described hereinafter. In addition to mandrel 37, the work head 34 includes a bearing block 38 which rotatably supports the mandrel 37. A sprocket 39 is mounted on one end of mandrel 37 and is connected by a chain 40 to a gear and rack arrangement generally indicated at 42 for imparting a uniform turning movement to the mandrel 37. While any conventional means of rotating the mandrel 37 may be used, the arrangement 42 includes an air cylinder 43 carrying a rack 44 which engages a gear 45 on a countershaft 46 journaled at the opposite ends in bearings 48. The countershaft 46 also carries a drive sprocket 49 which is engaged by the chain 40. The mandrel 37 includes a drum shaped body 50 and is sealed at the base by means of a suitable sealing clamp 53. An air chamber 54 connected to the back of the mandrel 37 pressurizes the interior of the bag 52 through passages 55 which communicate the surface of the drum 50 and the chamber 54. Suitable controls 56 mounted on a control panel 58 may be rigged to inflate and exhaust the flexible bag 52 when desired.

The work head 33 supports the mandrel 36 locked against rotation on a collar and shaft 60 which is reciprocally mounted in a frame 63 supported on the work surface 31. However, for convenience, a lockable but rotatable mounting for mandrel 36 may be provided in case it is desirable to be able to rotate or lock both mandrels at will. The mandrel 36 consists of a hollow flexible bag 61 sealed at the end by means of a sealing clamp 64, thus defining an interior space 65. An air chamber 66 mounted on the work surface 31 is connected with the space 65 through the shaft and collar 60 for pressurizing the bag 61 when required, for example, by actuating control 67. The mandrel 36 has two axial positions, a retracted position and an extended position indicated schematically by the dot-dash lines in FIGURES 8, 9 and it may be reciprocated between the two positions as will become apparent in the description of the inventive method which proceeds hereinafter.

A shaping head 70 on the end of an arm 72 is pivoted at 73 on the frame 63. The arm 72 may be swung down so that the head 70 is in axial alignment with the mandrel 37 when required.

The primary consideration is that a rotatable mandrel and a nonrotatable mandrel are provided and that one of the mandrels is reciprocal relative to the other and is formed of a flexible material capable of expanding and displacing itself over the surface of the other mandrel upon engagement with it.

*Method*

Figure 6:
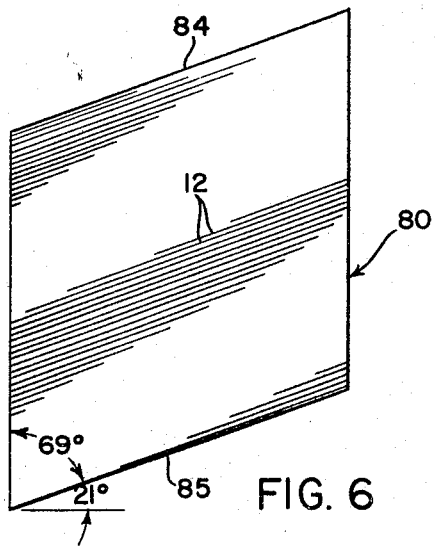
FIGURE 6 is a top plan view of the stock used in constructing the diaphragm of the present invention and showing the relationship of the reinforced elements relative to the edges thereof.
Figure 7:
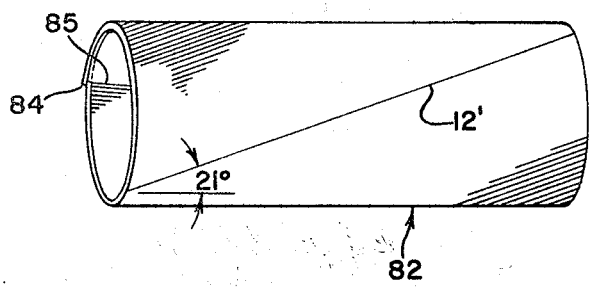
FIGURE 7 is a perspective view of the sleeve formed from the stock of FIGURE 6.

FIGURES 6–12 illustrate a method for making the improved diaphragm A. Referring to FIGURE 6, a flat, rhombic or parallelogram shaped material is provided which has the reinforcing tire cord strands 12 imbedded therein and extending linearly thereacross parallel to the longitudinal edges 84 and 85 of the material 80. While it is not necessary that the material 80 be rhomboidal in shape, one aspect of the invention is that the strands 12 extend at an angle so that when the material 80 is formed into a sleeve 82, as shown in FIGURE 7, the strands 12 will extend in helical fashion therein. The precise angle of the strands 12 is not critical, but it is preferred that the inclination be substantially less than 45° from the elemental direction of the sleeve 82 and a cutting angle of 21° has been found to work well. This primary cutting angle of 21° is subject to adjustment as individual diaphragm designs may require. Any flexible material properly reinforced may be used for the sleeve but reinforcing with closely spaced linear tire cord strands which are completely embedded in an elastomer is preferred.

The uncured rubber material 80 is wrapped around the mandrels 36 and 37 to form the sleeve 82 as shown in FIGURES 4 and 8 with the mandrel 36 in its retracted position. The edges 84, 85 may abut, or slightly overlap as shown in FIGURE 7 where the sleeve is in place on the mandrels. If desired a rubber sleeve 83 may be assembled on the one mandrel 37 first and then the reinforced sleeve 82 placed thereover. The sleeve 83 provides additional rubber during the molding of the diaphragm A as will be apparent hereinafter and also somewhat strengthens the diaphragm sidewalls. The bags 52 and 61 on the mandrels are not distended and hold the ends of sleeve 82 securely, however, if necessary, clamps may be provided to grip the sleeve ends, but since the uncured rubber material is somewhat tacky, the sleeve 82 generally will adhere sufficiently to hold the edges 84, 85 together and prevent relative rotation of the sleeve 82 on the mandrels.

At the beginning, the mandrel 36 is spaced from the end of the rotatable mandrel 37 by a distance approximately equal to the diameter of the mandrels which diameter approximates the diameter of the interior of the finished cup-shaped diaphragm A. Each mandrel 36 and 37 supports a substantial portion of the opposite ends of the sleeve 82 leaving the midsection between the faces of the mandrels unsupported. In accordance with the invention, the method proceeds by rotating mandrel 37 relative to mandrel 36 in the direction of inclination of the tire cord strands 12 and as indicated by the directional arrow in FIGURE 8. Since the mandrel 36 is locked against rotation and the ends of the sleeve are securely held, the rotation of mandrel 37 twists one end of the sleeve relative to the other causing the midsection to neck in the space between the mandrels. To compensate for the shortened condition of the sleeve 82, mandrel 36 moves axially to its extended position toward the rotatable mandrel 37 as shown in FIGURE 9. The amount of advance of mandrel 36 depends upon the angle through which mandrel 37 is rotated. Moreover, the angle of rotation determines the path of travel of the strands 12 (as depicted by the single strand 12') and in accordance with the invention, the mandrels 36, 27 are rotated approximately 180° relative to each other so that each strand 12 extends generally radially between the ends of the mandrels. That is, each strand 12 takes a path that will be tangential to the sleeve axis substantially completely constricting the sleeve 82 at the middle. Thus the strands bunch together near the center in the finished diaphragm A as depicted in FIGURE 2 tending to make the bottom D firm and relatively inflexible. The sleeve twist angle may exceed 180° depending on the design of the diaphragm and may be as much as 270° in some cases, the important point is that there is no unreinforced center area in the finished diaphragm A.

After the sleeve 82 has been twisted, as shown in FIGURE 9, a double walled cup 87 is formed by inflating the hollow bag 61 of mandrel 36 thus driving it over the mandrel 37. Bag 61 rolls out over the surface of mandrel 37 and folds one end of sleeve 82 over onto the other end. The end 85 of the sleeve 82 held by mandrel 37 forms the inner wall of the cup 87 and the end 86 held by mandrel 36 the outer wall. Preferably the end 86 overlaps the end 85 slightly as shown in FIGURE 10 for reasons to be explained. The reinforcing strands 12 thus extend up the outer wall of the cup 87 on one side, across the bottom, and down the inner wall on the opposite side.

After the folding step, mandrel 36 is retracted to its initial position and the shaping head 70 is lowered in alignment with mandrel 37 and substantially abutting the end of cup 87. At this point, the bag 52 of mandrel 37 is inflated sufficiently to turn the cup 87 inside out over shaping head 70 as depicted in FIGURE 11 thus giving the uncured rubber cup 87 its preliminary diaphragm shape in preparation for loading it into a suitable vulcanizing mold. Prior to molding, however, the overlapping end 86, which is now the inner wall of the reshaped cup 87, is folded back over the end 85 and the additional rubber sleeve 83 as illustrated in FIGURE 12 to provide additional reinforcing in the lip area of the finished diaphragm.

While the invention has been described with reference to a particular method and apparatus for making a novel diaphragm, it should be clear that certain modifications will occur to those having skill in the art; which modifications are intended to be covered by the appended claims except insofar as they are limited by the prior art.

Having thus described my invention, I claim:

1. A cup-shaped diaphragm including a base and side walls having a peripheral lip at the open end, said cup being comprised of a cured elastomeric material having reinforcing material embedded therein, the improvement comprising said material consisting of an inner and outer ply of reinforcing strands, with each strand of each ply extending from the lip to the base in one ply of the side wall thence across the base and thence to the lip in another ply of the side wall, the strands in each ply in the side wall being generally parallel to each other and the strands of adjacent plies being at an angle to each other.

2. A cup-shaped diaphragm as set forth in claim 1 wherein the reinforcing strands extend completely across the base close tangentially to the diaphragm axis to avoid an appreciable unreinforced center area.

3. A cup-shaped diaphragm as set forth in claim 2 wherein each reinforcing strand extends from the lip to the base and substantially halfway across the base in one ply then inclined and tangentially to the diaphragm axis and thence across the remainder of the base and down the side wall to the lip in another ply.

4. A cup-shaped diaphragm as set forth in claim 3 wherein each reinforcing strand extends generally radially across the base.

5. A cup-shaped diaphragm as set forth in claim 4 wherein substantially half of each reinforcing strand forms an inner and the other half an outer ply, the portions of reinforcing strands in one ply being inclined in the side wall of the diaphragm at an angle substantially less than 45 degrees in one direction from a plane containing the diaphragm axis and the portions of reinforcing strands in the other ply extending at an angle substantially less than 45 degrees from said plane in the opposite direction whereby the elements in the inner and outer plies cross with respect to each other.

References Cited

UNITED STATES PATENTS

| | | | |
|---|---|---|---|
| 2,033,354 | 3/1936 | Pennington | 92—103 X |
| 2,178,953 | 11/1939 | Chilton | 92—101 X |
| 2,564,693 | 8/1951 | Hornbostel | 92—103 |
| 3,026,909 | 3/1962 | Boteler | 92—103 X |
| 3,135,173 | 6/1964 | Jack | 92—101 X |

FOREIGN PATENTS

| | | |
|---|---|---|
| 1,202,889 | 7/1959 | France. |
| 1,230,681 | 4/1960 | France. |

MARTIN P. SCHWADRON, *Primary Examiner.*

MARK NEWMAN, I. C. COHEN, *Assistant Examiners.*